United States Patent
Freitag et al.

(10) Patent No.: US 7,502,209 B2
(45) Date of Patent: **\*Mar. 10, 2009**

(54) READ SENSORS HAVING NITROGENATED HARD BIAS LAYERS AND METHOD OF MAKING THE SAME

(75) Inventors: James Mac Freitag, Sunnyvale, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 418 days.

This patent is subject to a terminal disclaimer.

(21) Appl. No.: 11/258,550

(22) Filed: Oct. 24, 2005

(65) Prior Publication Data

US 2007/0091515 A1    Apr. 26, 2007

(51) Int. Cl.
*G11B 5/33* (2006.01)
(52) U.S. Cl. .................. 360/324.12; 360/324
(58) Field of Classification Search ............. 360/324.12
See application file for complete search history.

(56) References Cited

U.S. PATENT DOCUMENTS

| | | | | |
|---|---|---|---|---|
| 4,988,578 A | * | 1/1991 | Yamashita et al. | 428/678 |
| 5,180,640 A | * | 1/1993 | Yamashita et al. | 428/611 |
| 5,851,688 A | | 12/1998 | Chen et al. | |
| 5,998,048 A | * | 12/1999 | Jin et al. | 428/836.3 |
| 6,172,859 B1 | * | 1/2001 | Watanabe et al. | 360/327.3 |
| RE38,544 E | * | 7/2004 | Chen et al. | 204/192.2 |
| 6,841,259 B1 | | 1/2005 | Takahashi et al. | |
| 2002/0181171 A1 | * | 12/2002 | Chien et al. | 360/324.12 |
| 2003/0219630 A1 | | 11/2003 | Moriwaki et al. | |
| 2004/0247941 A1 | | 12/2004 | Chen et al. | |
| 2005/0264957 A1 | * | 12/2005 | Li et al. | 360/324.12 |
| 2005/0275975 A1 | * | 12/2005 | Zhang et al. | 360/324.12 |

OTHER PUBLICATIONS

N. Honda, High coercivity in Co-Cr films induced by nitrogen gas addition during room temperature sputter-deposition, IEEE Transactions on magnetics, Nov. 1995, pp. 2758-2760, vol. 31 Issue 6, USA.

\* cited by examiner

*Primary Examiner*—Andrea L Wellington
*Assistant Examiner*—Carlos E Garcia
(74) *Attorney, Agent, or Firm*—John J. Oskorep, Esq.; Rambod Nader

(57) ABSTRACT

A read sensor of a magnetic head includes a sensor stack structure formed in a central region; hard bias layers formed in side regions adjacent the central region; and lead layers formed over the hard bias layers in the side regions. The hard bias layers are made of a nitrogenated cobalt-based alloy, such as nitrogentated cobalt-platinum-chromium (CoPtCr). Suitable if not exemplary coercivity and squareness properties are exhibited using the nitrogenated cobalt-based alloy. The hard bias layers are formed by performing an ion beam deposition of cobalt-based materials using a sputtering gas (e.g. xenon) and nitrogen as a reactive gas.

12 Claims, 8 Drawing Sheets

READ SENSORS HAVING NITROGENATED HARD BIAS LAYERS AND METHOD OF MAKING THE SAME

BACKGROUND

1. Field of the Technology

This invention relates generally to magnetic read heads having read sensors for reading information signals from a magnetic medium, and more particularly to read sensors having hard bias layers made of nitrogenated cobalt-based alloys for improved hard magnet properties and methods of making the same.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer. A common type of MR sensor is the giant magnetoresistance (GMR) sensor which manifests the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g., nickel-iron (NiFe), cobalt (Co), or nickel-iron-cobalt (NiFeCo)) separated by a layer of nonmagnetic material (e.g., copper (Cu)) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (e.g., nickel-oxide (NiO), iridium-manganese (IrMn) or platinum-manganese (PtMn)) layer.

The magnetization of the other ferromagnetic layer, referred to as the free layer, however, is not fixed and is free to rotate in response to the field from the information recorded on the magnetic medium (the signal field). In the SV sensors, SV resistance varies as the cosine of the angle between the magnetization of the pinned layer and the magnetization of the free layer. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage. In addition to the magnetoresistive material, the GMR sensor has conductive lead structures for connecting the GMR sensor to a sensing means and a sense current source. Typically, a constant current is sent through the GMR sensor through these leads and the voltage variations caused by the changing resistance are measured via these leads.

To illustrate, FIG. 1 shows a prior art SV sensor 100 having side regions 104 and 106 which are separated by a central region 102. A free layer 110 is separated from a pinned layer 120 by a non-magnetic, electrically-conducting spacer 115. The magnetization of pinned layer 120 is fixed by an AFM pinning layer 121, which is formed on a gap layer 123 residing on a substrate 180. Cap layer 108, free layer 110, spacer layer 115, pinned layer 120, and AFM pinning layer 121 are all formed in central region 102. Gap layer 123 is typically an insulator layer made of an amorphous material such as alumina ($Al_2O_3$).

Conventionally, hard bias layers 130 and 135 are formed in side regions 104 and 106 in order to stabilize free layer 110. These hard bias layers 130 and 135 are typically formed of a cobalt-based alloy which is sufficiently magnetized and perhaps shielded so that the magnetic fields of the media and/or the write head do not effect the magnetism of the hard magnets. Seed layers 150 and 155 are also deposited in side regions 104 and 106 underneath hard bias layers 130 and 135 to set a texture for the successful deposition of the hard magnets by promoting a desired c-axis in plane orientation. To perform effectively, hard bias layers 130 and 135 should have a high coercivity, a high MrT (magnetic remanence× thickness), and a high in-plane squareness on the magnetization curve. A preferred cobalt-based alloy for hard bias layers 130 and 135 is cobalt-platinum-chromium (CoPtCr), while seed layers 150 and 155 typically comprise chromium (Cr) or other suitable metallic element.

Thus, as illustrated in FIG. 1, seed layers 150 and 155 and hard bias layers 130 and 135 are formed in side regions 104 and 106, respectively, and provide longitudinal bias for free layer 110. Leads 140 and 145 are formed over hard bias layers 130 and 135, respectively. Seed layers 150 and 155 are formed over the amorphous materials (e.g. alumina) of gap layer 123. Seed layers 150 and 155, hard bias layers 130 and 135 and lead layers 140 and 145 also abut first and second side edges of the read sensor in a connection which is referred to in the art as a "contiguous junction". Crystalline materials such as tantalum (Ta), nickel-iron (NiFe), cobalt-iron (CoFe), copper (Cu), platinum-manganese (PtMn) and ruthenium (Ru) are exposed at first and second side edges of the contiguous junctions. Leads 140 and 145 provide electrical connections for the flow of the sensing current $I_s$ from a current source 160 to the MR sensor 100. Sensing means 170 connected to leads 140 and 145 sense the change in the resistance due to changes induced in the free layer 110 by the external magnetic field (e.g. field generated by a data bit stored on a disk). One material for constructing the leads in the SV sensor is a highly conductive material, such as a metal.

FIG. 2 shows a prior art SV sensor 200, similar to prior art SV sensor 100 (FIG. 1), comprising side regions 204 and 206 separated by a central region 202. A free layer 210 is separated from a pinned layer 220 by a non-magnetic, electrically-conducting spacer 215. The magnetization of pinned layer 220 is fixed by an AFM pinning layer 221, which is formed on a gap layer 223 residing on a substrate 280. Cap layer 208, free layer 210, spacer layer 215 and pinned layer 220 are all formed in central region 202. Unlike prior art SV sensor 100 of FIG. 1, prior art SV sensor 200 of FIG. 2 is a partial mill design with materials of AFM pinning layer 221 of sensor 200 extending into side regions 204 and 206. By "partial mill design", it is meant that the read sensor layers are not fully etched or milled in side regions 204 and 206 prior to the deposition of the seed, hard bias, and lead materials. A partial mill design is desirable in order to reduce the spacing of the "read gap" (i.e. the distance from shield to shield which encapsulates the read sensor) so that the sensor's bit per inch (BPI) capability can be increased, as it reduces the possibility of electrical shorts to the shield.

As illustrated in FIG. 2, seed layers 250 and 255 and hard bias layers 230 and 235 are formed in side regions 204 and 206, respectively. Hard bias layers 230 and 235 provide longitudinal biasing for free layer 210. Leads 240 and 245 are formed over hard bias layers 230 and 235, respectively. In the partial mill design, seed layers 250 and 255 are formed directly on crystalline materials of sensor 202 which extend into side regions 204 and 206. In the example of FIG. 2, seed layers 250 are formed directly on top of materials of AFM layer 221 which extend into side regions 204 and 206. Seed layers 250 and 255, hard bias layers 230 and 235 and lead layers 240 and 245 also abut first and second side edges in side regions 204 and 206 adjacent SV sensor 200 in a contiguous junction. Leads 240 and 245 provide electrical connections for the flow of the sensing current $I_s$ from a current source 260 to the MR sensor 200. Sensing means 270 connected to leads 240 and 245 sense the change in the resistance due to changes induced in the free layer 210 by the external magnetic field.

What are needed are methods and apparatus for improving hard magnet properties in read sensors for narrow trackwidths.

SUMMARY

A read sensor of a magnetic head includes a sensor stack structure formed in a central region; hard bias layers formed in side regions adjacent the central region; and lead layers formed over the hard bias layers in the side regions. The hard bias layers are made of a nitrogenated cobalt-based alloy, such as nitrogentated cobalt-platinum (CoPt) or nitrogentated cobalt-platinum-chromium (CoPtCr). Suitable if not exemplary coercivity and squareness properties are exhibited using the nitrogenated cobalt-based alloy. The hard bias layers are formed by performing an ion beam deposition of cobalt-based materials using a sputtering gas (e.g. xenon) and nitrogen as a reactive gas. The magnetic head having the read sensor may incorporated into a data storage apparatus, such as a hard disk drive.

BRIEF DESCRIPTION OF THE DRAWINGS

For a fuller understanding of the nature and advantages of the present application, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

A read sensor of a magnetic head includes a sensor stack structure formed in a central region; hard bias layers formed in side regions adjacent the central region; and lead layers formed over the hard bias layers in the side regions. The hard bias layers are made of a nitrogenated cobalt-based alloy, such as nitrogentated cobalt-platinum-chromium (CoPtCr). Advantageously, suitable if not exemplary coercivity and squareness properties are exhibited with use of the nitrogenated cobalt-based alloy. The hard bias layers are formed by performing an ion beam deposition of cobalt-based materials using a sputtering gas (e.g. xenon) and nitrogen as a reactive gas. The magnetic head having the read sensor may incorporated into a data storage apparatus, such as a hard disk drive.

Figure 3:
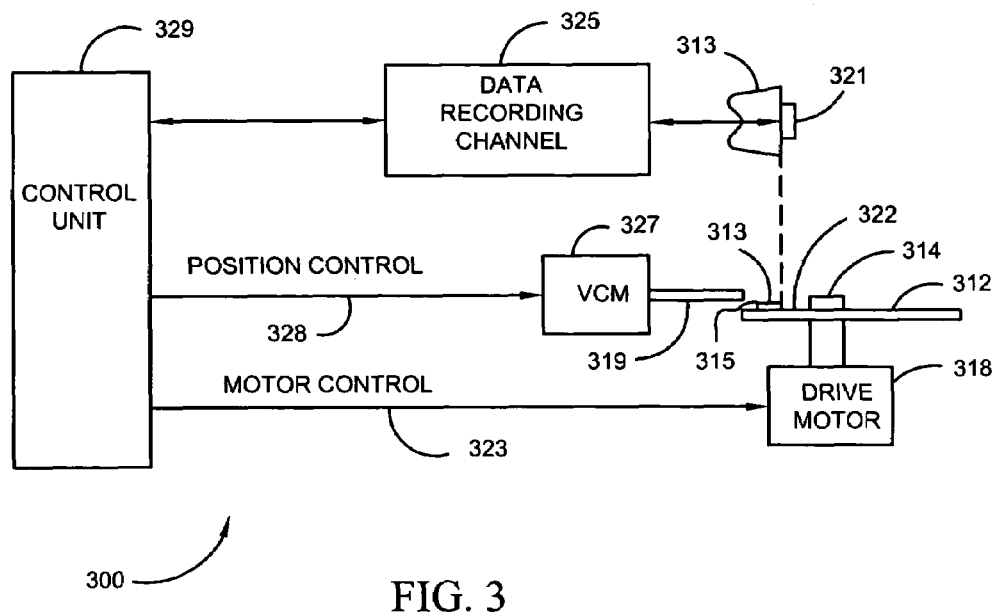
FIG. 3 is a block diagram of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312. At least one slider 313 is positioned on the disk 312, each slider 313 supporting a magnetic read/write head 321 which incorporates the SV sensor of the present invention. As the disks rotate, slider 313 is moved radially in and out over disk surface 322 so that head 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 (the surface of slider 313 which includes head 321 and faces the surface of disk 312 is referred to as an air bearing surface (ABS)) and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write head 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
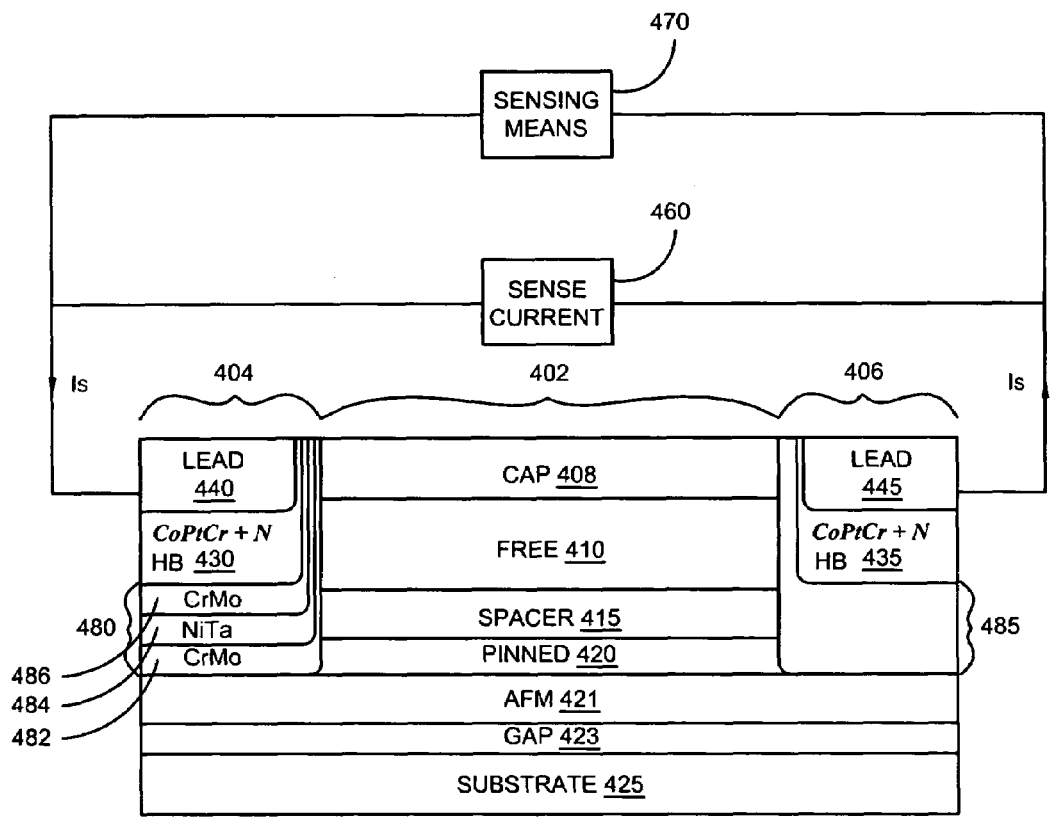
FIG. 4 is a schematic diagram of an ABS view of a thin film structure for a read sensor (e.g. an SV read sensor) of the present application having improved hard magnet properties.

FIG. 4 shows an air bearing surface (ABS) view of a spin valve (SV) sensor 400 (one type of read sensor) of a magnetic head of the present application. SV sensor 400 may be structurally viewed as having a central region 402 and side regions 404 and 406 which are adjacent central region 402. A sensing layer (free ferromagnetic layer) 410 is separated from a pinned layer (pinned ferromagnetic layer) 420 by a non-magnetic, electrically-conducting spacer layer 415. The magnetization of pinned layer 420 is fixed by an antiferromagnetic (AFM) layer 421 which lies directly below it. A cap layer 408 is positioned over the structure, and specifically over free layer 410. Cap layer 408, sensing layer 410, spacer layer 415 and pinned layer 420 are all formed in central region 402 and form components of a sensor stack structure of SV sensor 400. Although SV sensor 400 is shown as having a "top-type" configuration, it may have a "bottom-type" or other type of configuration in the alternative.

Figure 1:
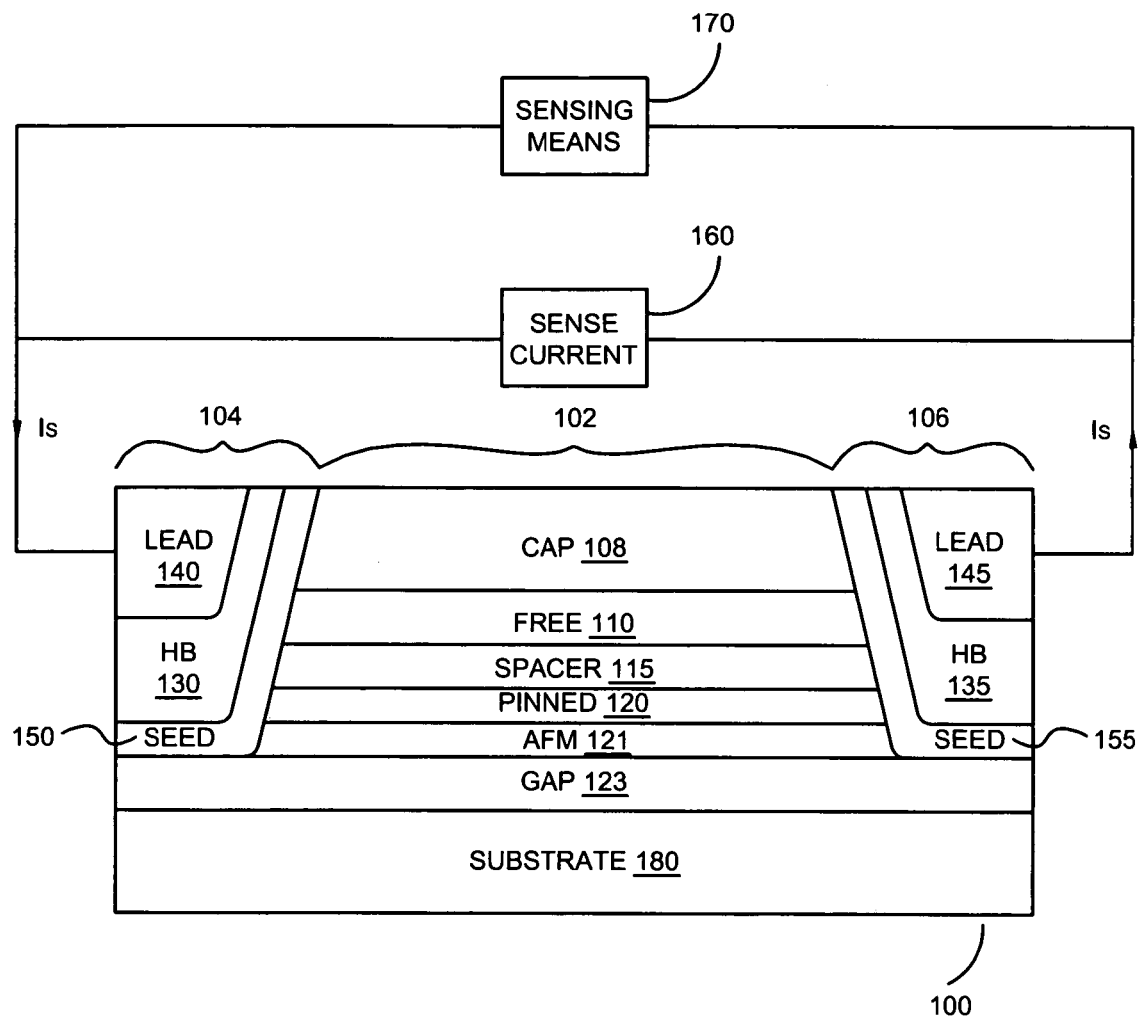
FIG. 1 is a schematic diagram of an air-bearing surface (ABS) view of the thin film structure of a prior art read sensor device (e.g. a spin valve or SV sensor)
Figure 2:
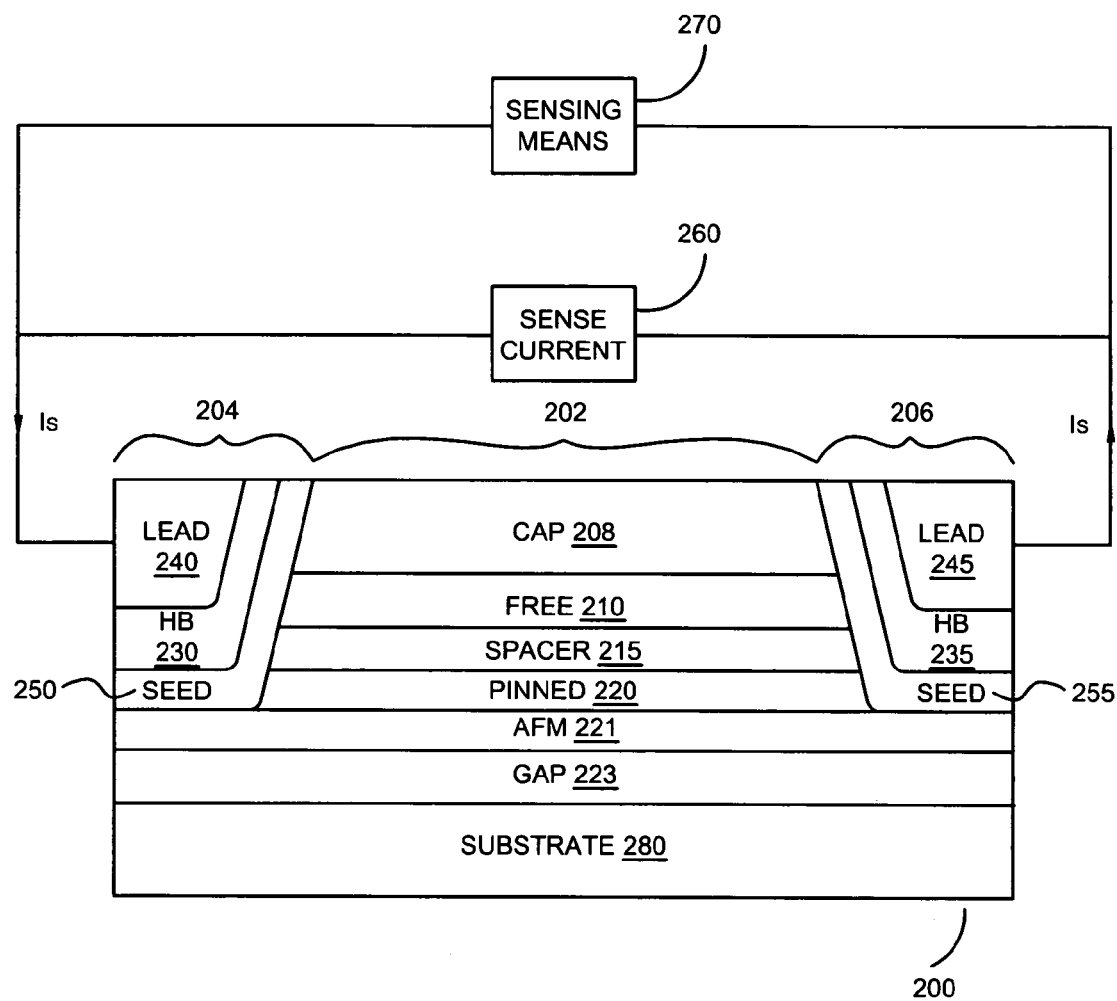
FIG. 2 is a schematic diagram of an air-bearing surface (ABS) view of the thin film structure of a "partial mill" prior art read sensor device.

In this embodiment, read sensor materials in side regions 404 and 406 are not fully (but only partially) removed from an ion milling process in this "partial-mill" design. As shown, AFM pinning layer 421 forms a component of the sensor stack structure in central region 402 but also extends into side regions 404 and 406. Such a partial mill design may be desirable in order to reduce the spacing of the "read gap" (i.e. the distance from shield to shield which encapsulates the read sensor) so that the sensor's bit per inch (BPI) capability can be increased), as it reduces the possibility of electrical shorts to the shield. Alternatively, SV sensor 400 of the present application is not a partial-mill design but rather takes on the structure shown and described earlier in relation to FIG. 1.

Exemplary materials for SV sensor 400 of the present embodiment are provided as follows. Sensing layer 410 is formed of nickel-iron (NiFe) and cobalt-iron (CoFe), pinned layer 420 is formed of cobalt-iron (CoFe), and spacer layer 415 is formed of copper (Cu). Pinned layer 420 comprises a multi-layer film structure such as a first ferromagnetic layer/spacer/second ferromagnetic layer (e.g., cobalt-iron (CoFe)/ruthenium (Ru)/cobalt-iron (CoFe)). AFM pining layer 421 may be formed of platinum-manganese (PtMn), iridium-manganese (IrMn), and nickel-oxide (NiO).

Hard bias layers 430 and 435 are formed in the side regions 404 and 406, respectively. Hard bias layers 430 and 435 provide a longitudinal bias for free layer 410. To provide adequate biasing for free layer 410, hard bias layers 430 and 435 are typically positioned adjacent, abutting, and/or in (planar) alignment with free layer 410. Lead layers 440 and 445 formed over hard bias layers 430 and 435, respectively, provide electrical connections for the flow of a sensing current $I_s$ from a current source 460 to SV sensor 400. A sensing means 470 connected to lead layers 440 and 445 sense the change in the resistance due to changes induced in free layer 410 by the external magnetic field (e.g. field generated by a data bit stored on a disk).

Multi-layered seed layer structures 480 and 485, which in this embodiment are "tri-layered" seed layer structures, are also formed in side regions 404 and 406, respectively. As shown, multi-layered structures 480 and 485 are formed below hard bias layers 430 and 435, respectively, and adjacent the sensor stack structure in central region 402. In particular, multi-layered structures 480 and 485 are formed adjacent crystalline materials of the sensor stack structure in side regions 404 and 406 (e.g. directly on the extended pinning layer of AFM materials). In this embodiment, multi-layered structure 480 is a trilayer seed layer structure having a first (bottom) layer 482, a second (middle) layer 484, and a third (bottom) layer 486. Although different types of materials may be utilized, first layer 482 is made of chromium-molybdenum (CrMo), second layer 484 is made of nitrogenated nickel-tantalum (NiTa+N), and third layer 486 is made of CrMo in FIG. 4. Although not explicitly detailed in FIG. 4, multi-layered structure 485 of SV sensor 400 has the same first, second, and third layers as multi-layered structure 480.

Preferably, the hard bias materials utilized in hard bias layers 430 and 435 is a cobalt-based material or alloy such as cobalt-platinum (CoPt) or cobalt-platinum-chromium (CoPtCr). The cobalt-based materials have a relatively small grain size, for example, on the order of 100 Angstroms. In accordance with the present application, the cobalt-based alloy is nitrogenated so as to form hard bias layers 430 and 435 as a nitrogenated cobalt-based alloy. Thus, a preferred material for use as hard bias layers 430 and 435 is nitrogenated cobalt-platinum-chromium (CoPtCr+N). As will be described in more detail below in relation to the method of FIGS. 5-9, hard bias layers 430 and 435 are formed by sputter-depositing a cobalt-based alloy using a sputtering gas as well as nitrogen as a reactive gas. The use of nitrogen in the deposition process causes the grain size of the CoPtCr to be reduced (e.g. to about 85 Angstroms).

Suitable if not exemplary coercivity and squareness properties are exhibited using the nitrogenated cobalt-based alloy. In the present embodiment, the squareness of hard bias layers 430 and 435 is between about 0.78-0.82 (e.g. about 0.81) with use of the nitrogenated cobalt-based alloy. Coercivity of the read sensor is maintained at sufficient and acceptable levels, between about 1500-2500 Oersteds.

Thus, the magnetic head has a sensor stack structure formed in central region 402, hard bias layers 430 and 435 formed in side regions 404 and 406 adjacent central region 402, and lead layers 440 and 445 formed over hard bias layers 430 and 435 in side regions 404 and 406, where hard bias layers 430 and 435 are made of a nitrogenated cobalt-based alloy. More particular, hard bias layers 430 and 435 are preferable made of nitrogenated cobalt-platinum (CoPt) or cobalt-platinum-chromium (CoPtCr). Hard bias layers 430 and 435 are formed in side regions 404 and 406 adjacent and in (planar) alignment with free layer 410 in central region 402.

Figure 5:
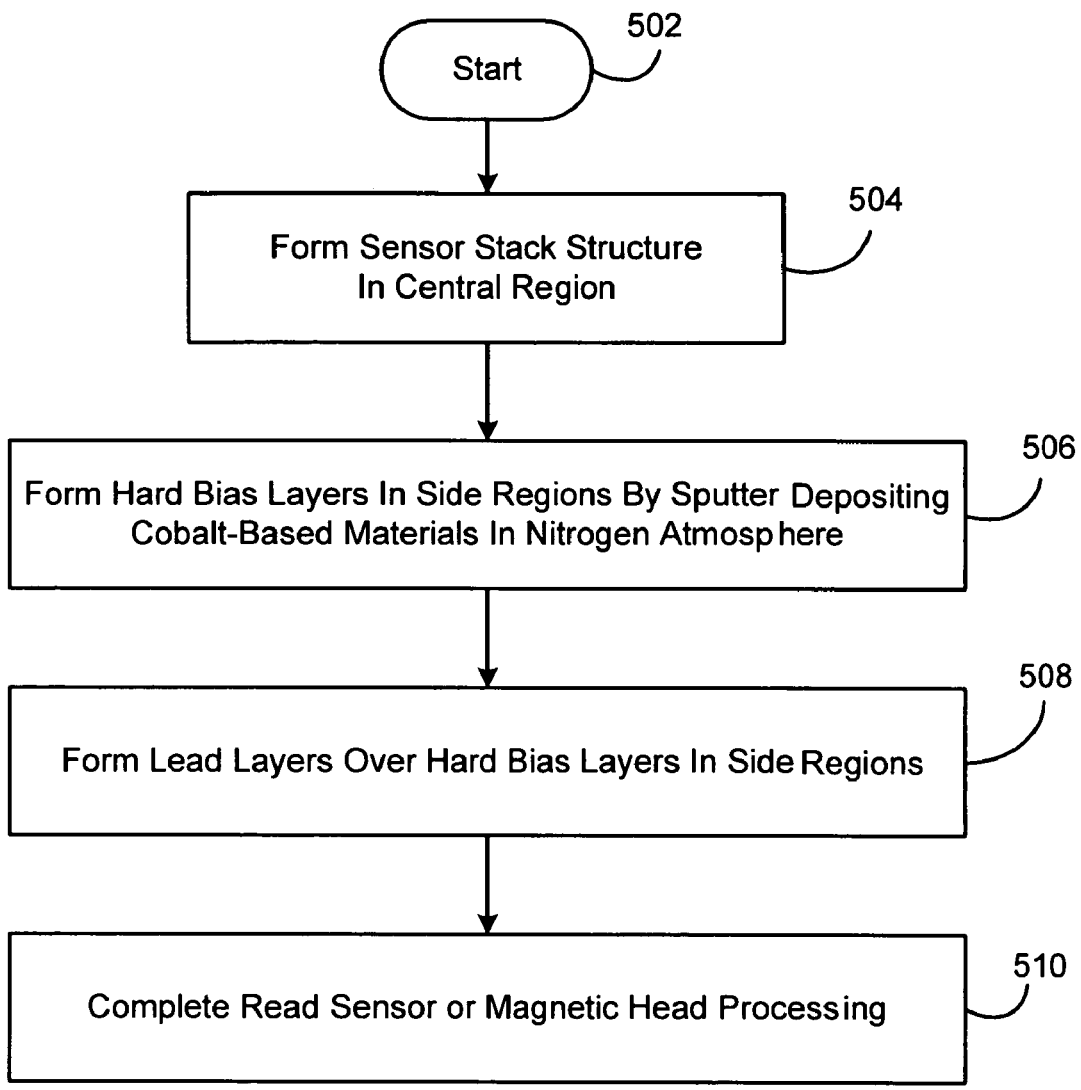
FIG. 5 is a flowchart describing a method of making a read sensor of the present application having improved hard magnet properties.

FIG. 5 is a flowchart describing a method of making a read sensor of the present application having improved hard magnet properties. FIG. 5 will be described in combination with FIGS. 6-9, which are cross-sectional views of partially-fabricated read sensor structures made in accordance with the method of FIG. 5.

Figure 6:
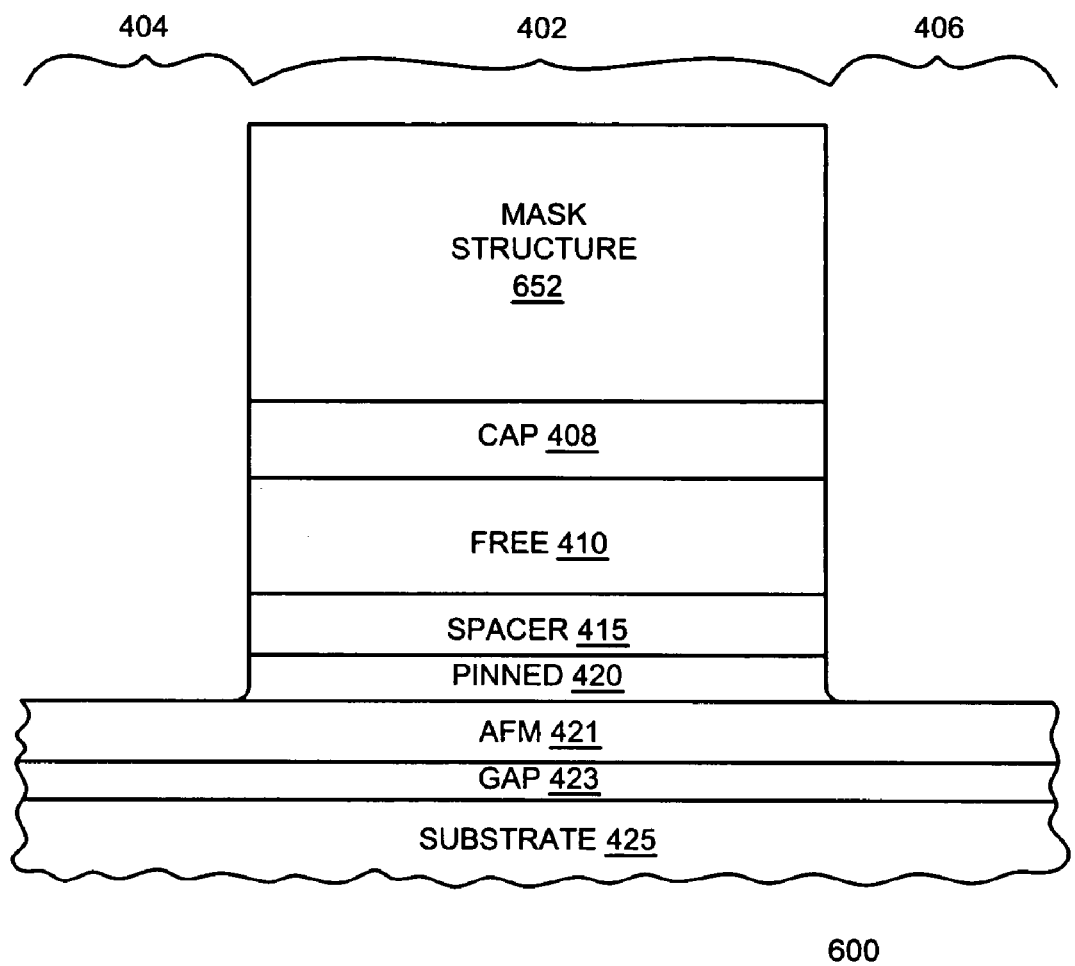
FIGS. 6-9 are cross-sectional views of partially-fabricated read sensor structures for use in describing the method of the flowchart of FIG. 5.

Beginning at a start block 502 of FIG. 5, a sensor stack structure 600 is formed in central region 402 as shown in FIG. 6 (step 504 of FIG. 5). To reach this stage of processing, SV sensor structure 600 is generally formed using full-film deposition, lithography, and etching techniques. In particular, a mask structure 652 is applied and patterned in central region 402 over a plurality of read sensor layers which are deposited in full film over gap layer 423. Mask structure 652 is formed with a suitable width so as to define an appropriate trackwidth (TW) for the SV sensor to be fabricated.

Mask structure 652 may be or include, for example, a resist such as a photoresist. However, non-resist materials in mask structure 652 may be utilized. Mask structure 652 is preferably formed so as to not have any undercuts, but rather straight sidewalls from top to bottom; that is, the mask structure sidewalls are substantially normal to a plane defined by the previously deposited read sensor layers. Although mask structure 652 may be a monolayer mask structure (e.g. a monolayer resist or photoresist), it may alternatively be a multi-layered mask structure (e.g. bilayer or trilayer structure) which is formed without undercuts. Alternatively, mask structure 652 may be structured so as to have undercuts (e.g. a bilayer resist having undercuts).

An etching (e.g. an ion beam milling process) is then performed with mask structure 652 kept in place. During the ion beam milling process, mask structure 652 masks what will become an active region of the SV sensor. The layers formed under mask structure 652 are protected during the ion milling process and remain intact. However, the portions of pinned layer 420, spacer layer 415, sensing layer 410, and capping layer 408 that are not protected by the mask during the ion milling process are removed in side regions 404 and 406 by the ion mill. The ion milling process can be stopped at any one of these layers, and even down to or partially through gap layer 423.

Figure 7:
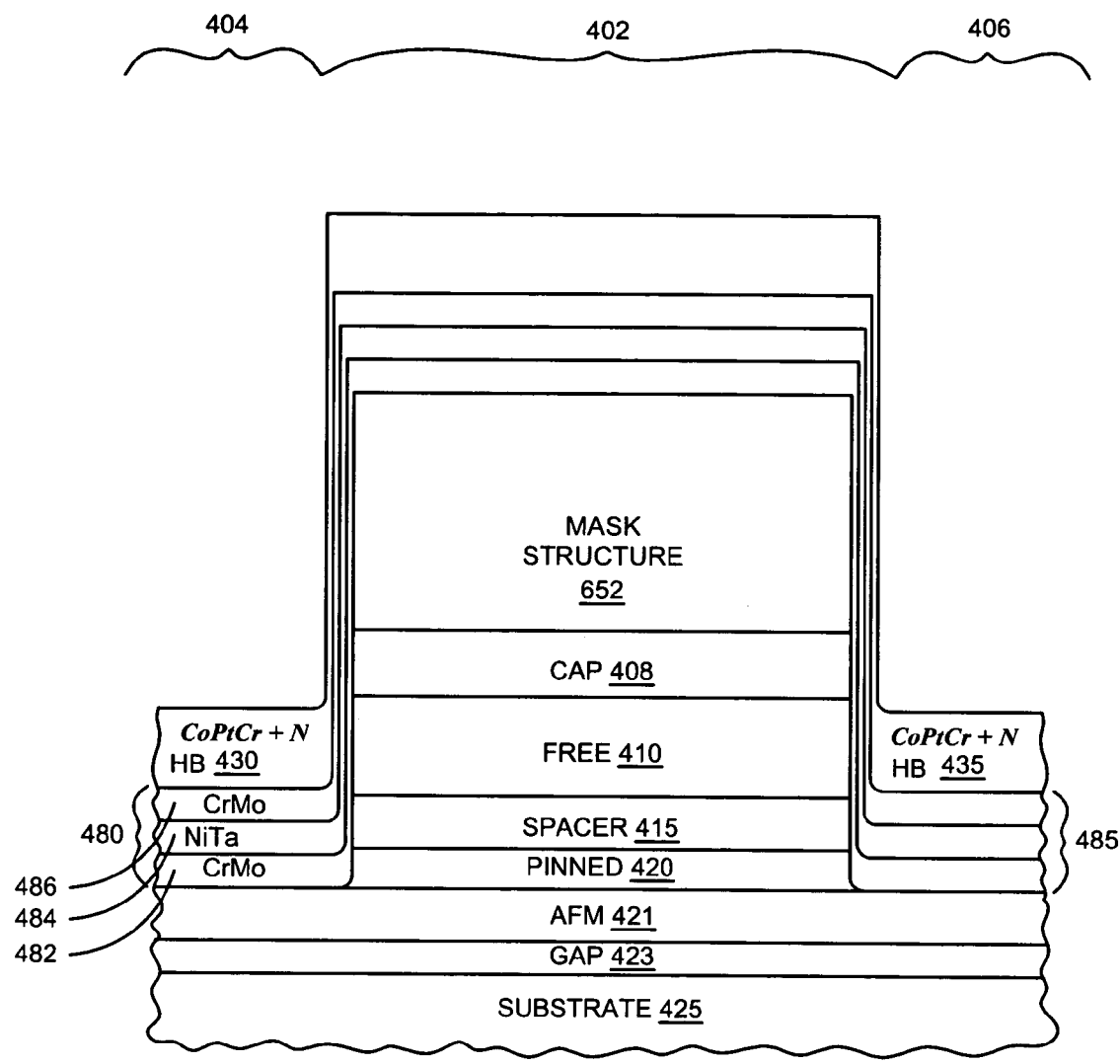

In FIG. 7, hard bias materials are deposited over the structure so as to form hard bias layers 430 and 435 in side regions 404 and 406, respectively, and over the top of mask structure 652 (step 506 of FIG. 5). This hard magnet deposition is performed after the formation of seed layer structures 480 and 480 in side regions 404 and 406, respectively. Hard bias layers 430 and 435 are located in side regions 404 and 406 so as to be in alignment with free layer 410 in central region 402. In general, hard bias layers 430 and 435 are provided for longitudinally biasing free layer 410 in central region 402.

As described above in relation to FIG. 4, hard bias layers 430 and 435 are made of or include a nitrogenated cobalt-based alloy (e.g. CoPtCr+N). To form hard bias layers 430 and 435, an ion beam sputtering system is used. In particular, cobalt-based materials are deposited by ion beam deposition with use of a sputtering gas in nitrogen ($N_2$) atmosphere. The sputtering gas may be, for example, an xenon (Xe) gas. The nitrogen is not used as part of the sputtering ions, but is rather supplied as a reactive gas in a deposition chamber of the system during the deposition. The cobalt-based materials have a reduced and relatively small grain size (e.g. on the order of approximately 85 Angstroms) due at least in part to use of the nitrogen in the deposition process. Furthermore, suitable if not exemplary coercivity and squareness properties are exhibited using the nitrogenated cobalt-based alloy. In the present embodiment, the squareness of hard bias layers 430 and 435 is between about 0.78-0.82 (e.g. about 0.81) with use of the nitrogenated cobalt-based alloy. Coercivity of the read sensor is maintained at sufficient and acceptable levels, between about 1500-2500 Oersteds (at least greater than 1000 Oersteds).

In this embodiment, seed layer structures 480 and 485 are tri-layer seed layer structures having a first (bottom) layer 482 made of chromium-molybdenum (CrMo), a second (middle) layer 484 of nitrogenated nickel-tantalum (NiTa+N), and a third (top) layer (486) made of chromium-molybdenum (CrMo). First layer 482 made of CrMo may be deposited to a thickness between 3 to 50 Å, and preferably has a specific thickness of about 10 Å. To form second layer, 484, NiTa is deposited in a nitrogen ($N_2$) atmosphere over first layer 482. Preferably, second layer 484 of the nitrogenated NiTa is deposited to a thickness between about 3 to 100 Å, and preferably has a specific thickness of about 15 Å. In this embodiment, the NiTa is deposited in the nitrogen atmosphere with a nitrogen partial pressure of about $2.5 \times 10^{-5}$ Torr.

The NiTa is then exposed to oxygen for a time period of about 30 seconds, for example. The partial pressure of the oxygen is between about $5 \times 10^{-6}$ Torr and $5 \times 10^{-5}$ Torr, or preferably to about $2.5 \times 10^{-5}$ Torr. Third layer 486 made of CrMo is then deposited over second layer 484 made of the nitrogenated nickel-tantalum. Preferably, third layer 486 is deposited to a thickness between 20 to 200 Å, and preferably has a specific thickness of about 50 Å.

Figure 8:
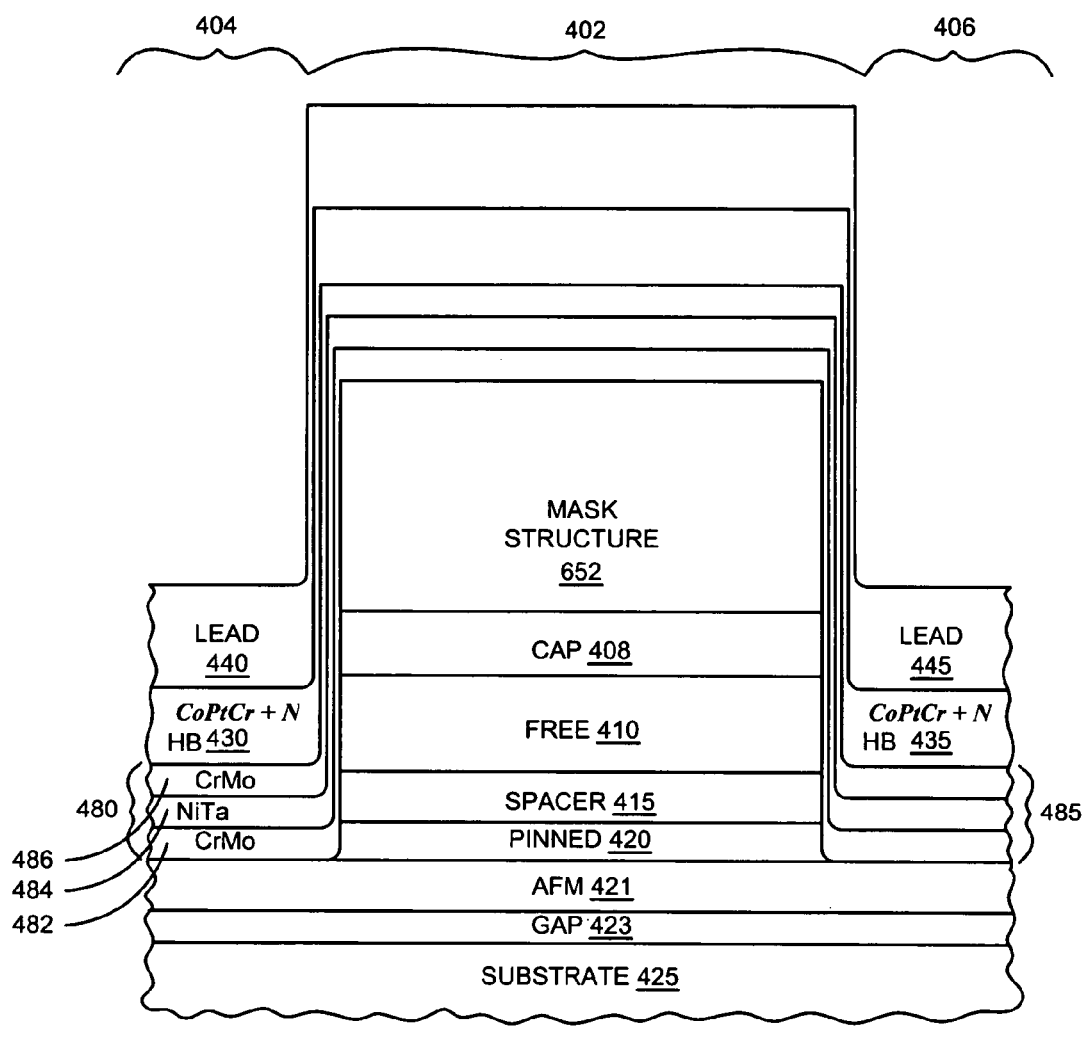

Next in FIG. 8, lead layers 440 and 445 are deposited over the structure in side regions 404 and 406, respectively, as well as over mask structure 652 (step 508 of FIG. 5). Lead layers 440 and 445 may be made of any suitable electrically conductive material, such as a metal (e.g. Rhodium). A chemical-mechanical polishing (CMP) is then performed over the structure to remove mask structure 652 and to form a top planar surface for the read sensor. In general, the mechanical interaction of a CMP pad during the CMP process removes the mask structure 652 from the remaining layers underneath it. The CMP pad makes physical contact with the mask structure materials (i.e. mask structure having the hard bias and lead layers formed thereover) and compresses them until the CMP pad reaches a top surface of the sensor structure. Alternatively, if mask structure 652 is formed with undercuts (e.g. a bilayer mask with undercuts), the mask structure may be removed by utilizing a suitable conventional solvent. The resulting structure is shown in FIG. 9.

Figure 9:
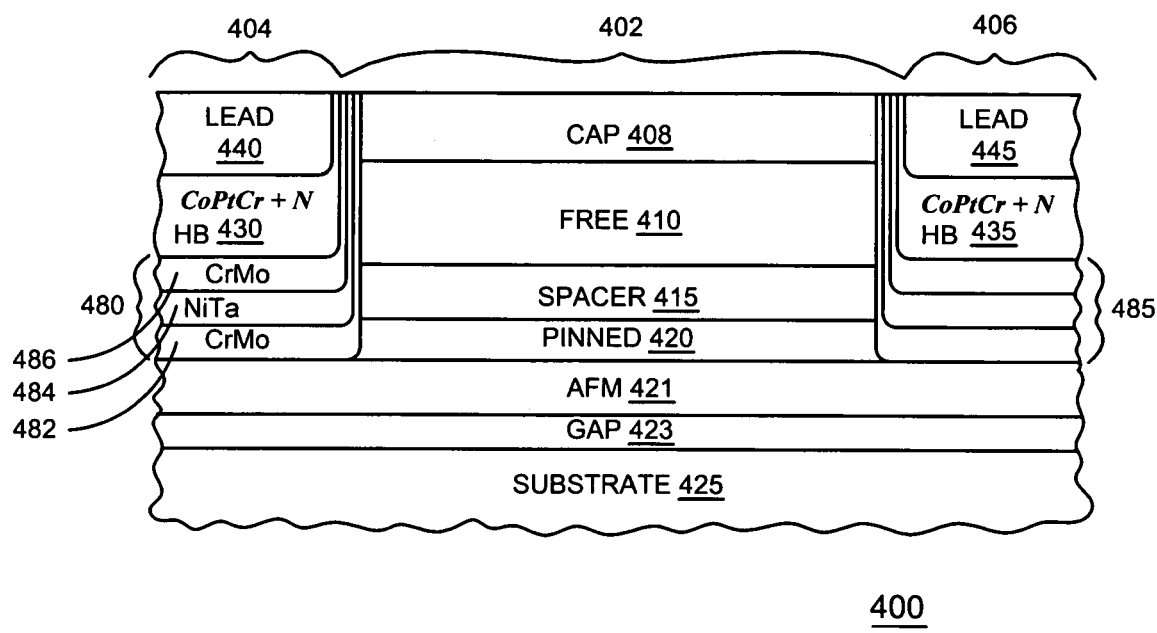

The resulting SV sensor 400 of FIG. 9 has an active SV structure formed in central region 402 and lead layers 440 and 445 and hard bias layers 450 and 455 formed in side regions 404 and 406, respectively. Hard bias layers 450 and 455 are suitably formed so as to longitudinally bias free layer 410. Lead layers 440 and 445 provide electrical connections for the flow of a sensing current $I_s$ from a current source to the sensor. A sensing means connected to lead layers 440 and 445 sense the change in the resistance due to changes induced in free layer 410 by an external magnetic field (e.g. field generated by a data bit stored on a disk). Additional conventional processing steps may be performed to complete the fabrication of read sensor 600 and the magnetic head (step 510 of FIG. 5).

Final Comments. A read sensor of a magnetic head includes a sensor stack structure formed in a central region; hard bias layers formed in side regions adjacent the central region; and lead layers formed over the hard bias layers in the side regions. The hard bias layers are made of a nitrogenated cobalt-based alloy, such as nitrogentated cobalt-platinum-chromium (CoPtCr). Suitable if not exemplary coercivity and squareness properties are exhibited using the nitrogenated cobalt-based alloy. The hard bias layers are formed by performing an ion beam deposition of cobalt-based materials using a sputtering gas (e.g. xenon) and nitrogen as a reactive gas. The magnetic head having the read sensor may incorporated into a data storage apparatus, such as a hard disk drive.

It is to be understood that the above is merely a description of preferred embodiments of the invention and that various changes, alterations, and variations may be made without departing from the true spirit and scope of the invention as set for in the appended claims. The read sensor of the present application may be any suitable type of read sensor, such as a current-in-plane (CIP) type GMR read sensor, a current-perpendicular-to-plane (CPP) type GMR read sensor, or a tunnel valve or magnetic tunnel junction (MTJ) type read sensor. Few if any of the terms or phrases in the specification and claims have been given any special particular meaning different from the plain language meaning to those skilled in the art, and therefore the specification is not to be used to define terms in an unduly narrow sense.

What is claimed is:

1. A read sensor, comprising:
   a sensor stack structure formed in a central region;
   seed layers formed in side regions adjacent the central region;
   hard bias layers formed over the seed layers in the side regions;
   lead layers formed over the hard bias layers in the side regions; and
   the hard bias layers comprising a nitrogenated cobalt-based alloy.

2. The read sensor of claim 1, wherein the nitrogentated cobalt-based alloy comprises nitrogenated cobalt-platinum (CoPt).

3. The read sensor of claim 1, wherein the nitrogentated cobalt-based alloy comprises nitrogenated cobalt-platinum-chromium (CoPtCr).

4. The read sensor of claim 1, further comprising:
   the seed layers comprising a chromium-based alloy;
   a free layer of the sensor stack structure; and
   the hard bias layer formed adjacent the free layer and longitudinally biasing the free layer.

5. The read sensor of claim 1, having an improved squareness due to the nitrogenation of the cobalt-based alloy.

6. The read sensor of claim 1, further comprising a magnetic head Which incorporates the read sensor.

7. A data storage apparatus, comprising:
   at least one rotatable magnetic disk;
   a spindle supporting the at least one rotatable magnetic disk;
   a disk drive motor for rotating the at least one rotatable magnetic disk;
   a magnetic head for reading data from the at least one rotatable magnetic disk;
   a slider for supporting the magnetic head;
   the magnetic head including a read sensor having:
      a sensor stack structure formed in a central region;
      seed layers formed in side regions adjacent the central region;
      hard bias layers formed in side regions adjacent the central region;
      lead layers formed over the hard bias layers in the side regions; and
      the hard bias layers comprising a nitrogenated cobalt-based alloy.

8. The data storage apparatus of claim 7, wherein the nitrogentated cobalt-based alloy comprises nitrogenated cobalt-platinum (CoPt).

9. The data storage apparatus of claim 7, wherein the nitrogentated cobalt-based alloy comprises nitrogenated cobalt-platinum-chromium (CoPtCr).

10. The data storage apparatus of claim 7, further comprising:
    the seed layers comprising a chromium-based alloy;
    a free layer of the sensor stack structure; and
    the hard bias layer formed adjacent the free layer and longitudinally biasing the free layer.

11. The data storage apparatus of claim 7, wherein the read sensor exhibits a coercivity greater than 1000 Oersteds and the hard bias layers exhibit a squareness greater than 0.78.

12. The data storage apparatus of claim 7, having an improved squareness due to the nitrogenation of the cobalt-based alloy.

* * * * *